United States Patent

Bonja et al.

[11] Patent Number: 5,646,678
[45] Date of Patent: Jul. 8, 1997

[54] DIGITAL VIDEO NETWORK WITH CONTINUOUS AUDIO PRESENCE AT NETWORK SITES

[75] Inventors: Mario Bonja, Boisbriand; Simon John Peter Phillip Worrall, Pointe Claire; Richard Romagnino, Montreal, all of Canada

[73] Assignee: Northern Telecom Limited, Montreal, Canada

[21] Appl. No.: 413,556

[22] Filed: Mar. 30, 1995

[51] Int. Cl.$^6$ .............. H04N 7/14; H04N 7/15; H04N 9/74; H04N 9/76

[52] U.S. Cl. .............. 348/15; 348/16; 348/17; 348/588; 348/598; 455/6.3

[58] Field of Search .............. 348/13, 14, 15, 348/16, 17, 563, 564, 565, 584, 588, 598, 599, 12; 455/5.1, 6.3; 379/202, 203, 206; H04N 5/445, 5/45, 9/74, 9/76, 7/14, 7/15

[56] References Cited

U.S. PATENT DOCUMENTS

| | | | |
|---|---|---|---|
| 5,003,532 | 3/1991 | Ashida et al. | 348/15 |
| 5,382,972 | 1/1995 | Kannes | 348/14 X |
| 5,408,261 | 4/1995 | Kamata et al. | 348/17 X |
| 5,453,780 | 9/1995 | Chen et al. | 348/14 X |
| 5,537,141 | 7/1996 | Harper et al. | 348/13 X |

*Primary Examiner*—John K. Peng
*Assistant Examiner*—John W. Miller
*Attorney, Agent, or Firm*—R. John Haley

[57] ABSTRACT

A digital video network comprises a controller and network sites each coupled to the controller via communication paths. The network sites and controller include codecs for converting between encoded signals on the communications paths and video and audio signals in the network sites and in the controller. The controller also includes at least one unit for producing a quad split video signal from four video signals supplied thereto. The coders encode four audio signal channels and audio mixing control signals in each encoded signal. The decoder in each network site decodes the audio signal channels from the encoded signal which it receives, and is responsive to the control signal in the encoded signal to mix the decoded audio signal channels in a predetermined manner to provide a continuous audio presence at the network site, independently of whether or not the video signal in the encoded signal comprises the quad split video signal.

19 Claims, 10 Drawing Sheets

DIGITAL VIDEO NETWORK WITH CONTINUOUS AUDIO PRESENCE AT NETWORK SITES

This invention relates to digital video networks, and is particularly concerned with a digital video network controller which can provide continuous audio presence in such networks, and to a method of communicating signals in a digital video network.

BACKGROUND OF THE INVENTION

In a digital video network (DVN), digital video signals are communicated among several sites which are geographically separate from one another. Although DVNs have applications in many areas, such as video communications for business, medical, government, correctional, and military institutions, and the invention is applicable to DVNs in general, a primary application of DVNs is in education, and the invention is therefore described in this specification in terms of its application in this area, referred to as a distance learning environment.

In the distance learning environment, the sites are referred to for convenience as teacher (T) and student (S) sites. A typical distance learning session involves a teacher at one site (T) communicating with several student classrooms situated at other sites (S) remote from the teacher's site.

One known form of DVN provides for distance learning sessions involving a teacher site and up to three students sites, referred to as a 3S+T configuration. Each site includes at least one video camera for producing a video signal at the site, at least one video monitor for displaying a received video signal, and a video codec (coder-decoder) for coding and decoding video signals for communication as DS-3 signals. The DVN also includes a controller comprising a DS-3 switch, for switching the DS-3 signals, four video codecs, at least one quad split unit, and four audio mixers. The DS-3 signals provide communications (video, audio, and control signals) in both directions of transmission between each site and the controller.

The quad split unit is a device which is supplied with up to four incoming video signals and produces at an output, selectively, either a video signal which is a composite of the four incoming signals, one incoming picture in each of four quadrants of the outgoing signal picture, or any one of the four incoming video signals. The latter is referred to as a zoomed picture, even though it represents a normal picture, because it occupies the whole of the monitor screen and hence has four times the area of each quadrant of the composite picture.

In use of this DVN, the DS-3 switch in the controller is controlled to set up a desired session among the teacher and three student sites, which may be selected from a possibly much larger number of sites. During the session, the controller (under the control of the teacher) determines what DS-3 signals are sent to, and hence what pictures are displayed on the monitors at, the different sites. For example, at one time the teacher may wish to display a quad split or composite picture at all of the sites; at another time the teacher may wish to display a zoomed picture from any one of the sites at the other sites and a quad split picture at the one site.

It is important for the switching to be effected in a manner which is not disturbing to the students and the teacher, and which ensures that each quad split picture is displayed at each site with a fixed arrangement of pictures from the other sites. For example, it may be required that the quad split picture at each student site always display the teacher's video signal in the top left quadrant, and display the video signals from the other three student sites in fixed positions in the other three quadrants.

Although the known DVN has effected the video switching in an acceptable manner, at least when using suitably fast DS-3 switches, it provides a less satisfactory result for the audio signals. More specifically, it is desirable to provide a continuous audio presence in which each site at all times receives a mix of the audio signals from all of the other sites. Thus each site needs to be supplied with an audio signal which is a mix of all of the audio signals minus the audio signal of the particular site (to avoid feedback problems), commonly referred to as a mix-minus function. In the known DVN, the audio mixers provide this function for sites displaying a quad split picture, but any site displaying a zoomed picture is supplied only with the audio signal related to that zoomed picture. Consequently, there is an undesired audio switching, and loss of continuous audio presence, which accompanies the video switching between quad split and zoomed pictures.

A further disadvantage of the known DVN is its limitation to four sites. An increase to five sites is desirable, considering that the quad split picture enables each site to display pictures from four other sites. Thus it is desirable to provide for a five-site or 4S+T configuration. At the same time, it is required that the DVN easily accommodate lesser configurations, such as 3S+T and 2S+T, for different sessions.

An object of this invention is to provide an improved digital video network which enables the requirements discussed above to be met.

SUMMARY OF THE INVENTION

According to one aspect, this invention provides a digital video network controller for receiving encoded signals from and supplying encoded signals to network sites via respective communications paths, each network site including a video coder and decoder, the controller comprising: at least four video decoders each having an input for an encoded signal, an output for a video signal, and an output for an audio signal; five video coders each having an input for a video signal, four inputs for audio signals, and an output for an encoded signal; a switching unit for coupling the encoded signal inputs of the decoders and the encoded signal outputs of the coders to the communications paths for respectively receiving encoded signals therefrom and supplying encoded signals thereto; video signal connections, including at least one quad split unit, coupling the video signal outputs of the decoders to the video signal inputs of the coders, the quad split unit providing a video signal representing a composite of four video signals supplied thereto; audio signal connections coupling the audio signal output of each decoder to audio signal inputs of at least four of the video coders; and a control unit for controlling the switching unit and for controlling the decoder at each network site to provide a mix of at least three of the four audio signals in the encoded signal supplied to it, thereby to provide a continuous audio presence at each network site.

In one embodiment of the invention there are five decoders, the quad split unit has four video signal inputs coupled to the video signal outputs of four of the decoders and a video signal output coupled to the video signal input of one of the coders, and the video signal output of the fifth decoder is coupled to the video signal input of each of the other four coders. In another embodiment of the invention there are five decoders and five quad split units, each quad split unit has a video signal output coupled to the video signal input of a respective corresponding one of the coders, wherein each quad split unit has four video signal inputs coupled to the video signal outputs, and the four audio signal inputs of the corresponding coder are coupled to the audio signal outputs, of a respective set of four of the five decoders, and wherein the control unit further provides control of each quad split unit to supply selectively to its video signal output either the video signal representing a composite of the four video signals supplied to the quad split unit or a selected one of the four video signals supplied to the quad split unit. In a further embodiment of the invention there are four decoders, the quad split unit has four video signal inputs coupled to the video signal outputs of the four decoders and a video signal output coupled to the video signal input of one of the coders, and the video signal outputs of the four decoders are also coupled each to the video signal input of a respective one of the other four coders.

The invention also provides a digital video network comprising a digital video network controller as above and at least two network sites coupled to the controller via the communications paths, each network site including a video coder for supplying encoded signals via a respective communication path to the controller, a video camera for supplying video and audio signals to the video coder, a video decoder for receiving encoded signals via a respective communication path from the controller, and a monitor for reproducing at the network site video and audio signals decoded by the decoder, wherein the encoded signals received by the decoder at each network site include control signals from the control unit of the controller for determining a mix of audio signals supplied from the decoder to the monitor.

According to another aspect, this invention provides a digital video network comprising a controller and a plurality of network sites among which encoded signals are communicated via communications paths coupling each network site to the controller, the network sites and the controller including coders and decoders for converting between the encoded signals on the communications paths and video and audio signals in the network sites and in the controller, the controller further including at least one unit for producing a composite picture video signal from a plurality of video signals supplied thereto, wherein the coders provide for encoding a plurality of audio signal channels and audio mixing control signals in the encoded signals, each coder in the controller is supplied with audio signals from a plurality of decoders in the controller and with a control signal for determining a mix of these audio signals, and the decoders in the network sites provide for decoding the plurality, of audio signal channels from the encoded signals, and wherein each decoder in a network site is responsive to the control signal in the encoded signal which it receives to mix the plurality of decoded audio signal channels in a predetermined manner to provide a continuous audio presence at each network site independently of whether or not the video signal in the encoded signal supplied to each network site comprises said composite video signal.

A further aspect of the invention provides a method of communicating encoded signals between a controller and a plurality of network sites of a digital video network via respective communications paths, comprising the steps of: in the controller, decoding an encoded signal received from each network site to produce a video signal and an audio signal, producing at least one composite picture video signal from a plurality of the video signals, and coding selected ones of the video signals and the composite picture video signal each with a plurality of the audio signals and a control signal to produce an encoded signal for supply to each network site; and in each network site, producing a local video signal and a local audio signal in the network site, encoding the local video signal and the local audio signal to produce an encoded signal for supply to the controller, decoding an encoded signal received from the controller to produce a video signal and a plurality of audio signals, mixing the plurality of audio signals in a predetermined manner in accordance with the control signal in the received encoded signal, thereby to produce a mixed audio signal comprising audio signals from the respective other network sites without the respective local audio signal, and reproducing the video signal and the mixed audio signal.

There can be up to four network sites, in which case the audio signals from all of the network sites are supplied to each coder in the controller, and the control signal in the encoded signal supplied to each network site controls the decoder in the network site to mix all of the audio signals except that derived from the respective network site to produce the mixed audio signal. Alternatively there can be five network sites, in which case the audio signals from a respective group of four of the network sites are supplied to each coder in the controller, each network site is supplied from a respective coder in the controller with an encoded signal including the audio signals derived from the respective four other network sites, and the control signal in the encoded signal supplied to each network site controls the decoder in the network site to mix all of the audio signals to produce the mixed audio signal.

BRIEF DESCRIPTION OF THE DRAWINGS

The invention will be further understood from the following description with reference to the accompanying drawings, in which.

DETAILED DESCRIPTION

Figure 1:
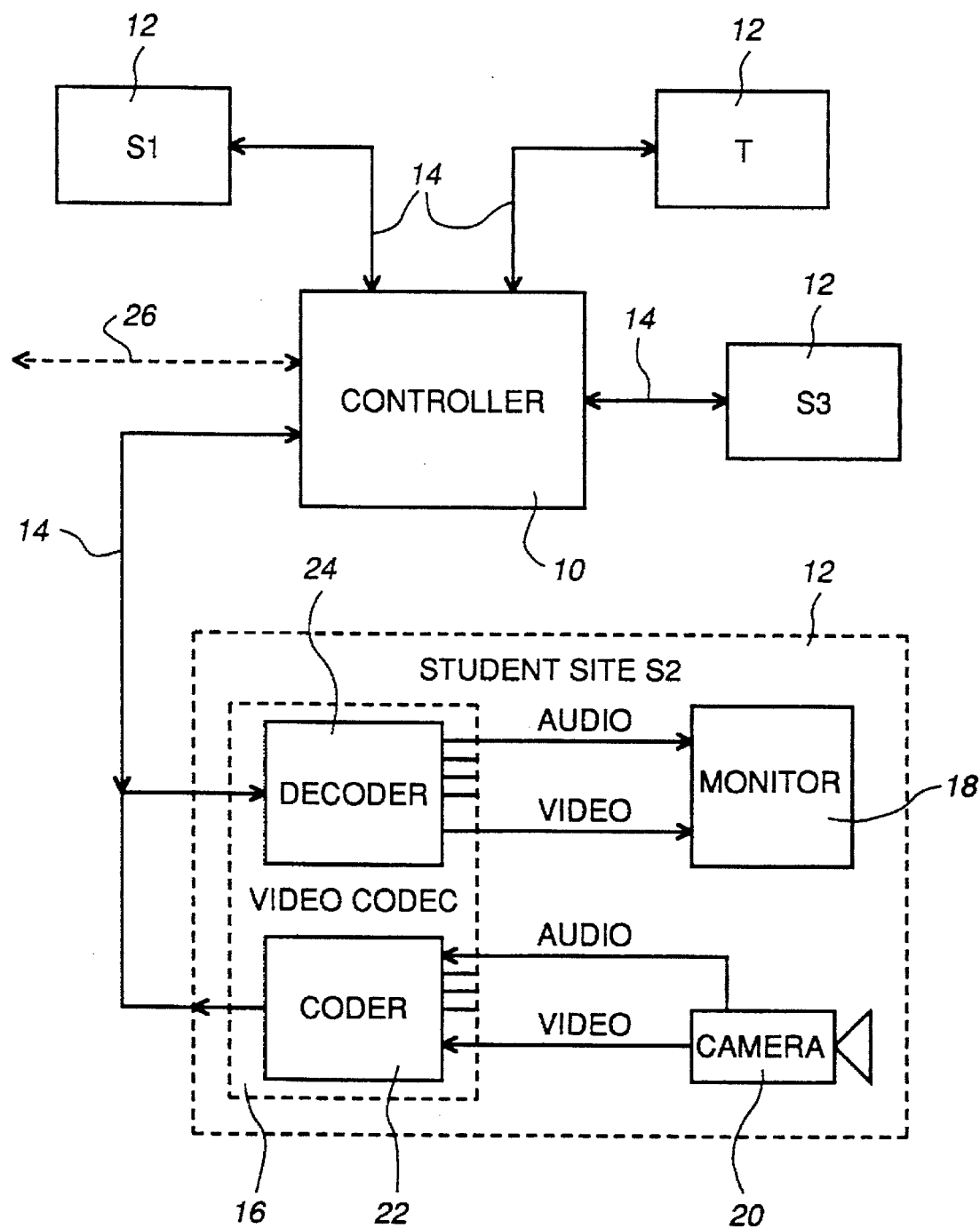
FIG. 1 schematically illustrates a known digital video network (DVN)

Referring to FIG. 1, a known DVN is illustrated including a controller 10 and four sites 12, referenced T, S1, S2, and S3, each of which is connected to the controller via a path 14 providing for transmission of a DS-3 signal in each direction of transmission. The sites 12 can all include similar equipment, and as shown for the student site S2 this includes at least a video codec 16 and a video monitor 18 and camera 20. The video codec 16 comprises a coder 22 and a decoder 24. Video and audio signals are supplied from the camera 20 to the coder 22, which encodes these into a DS-3 signal which is supplied to the controller 10 via the path 14. In the opposite direction of transmission, a DS-3 signal supplied from the controller 10 to the path 14 is supplied to the decoder 24 to produce video and audio signals for reproduction on the monitor 18. As shown by broken lines, the controller 10 can be connected to other sites and other controllers in a more extensive network via DS-3 signal paths 26.

The video codec 16, and each other video codec referred to below, is a DV45B video codec available from Northern Telecom Limited. As discussed later below, this codec provides four audio channels, and accordingly FIG. 1 shows the decoder 24 as having four audio outputs only the first (upper) one of which is connected, and shows the coder 22 as having four audio inputs only the first (upper) one of which is connected. For clarity throughout the drawings the video coders and decoders are shown in a consistent manner with the four audio outputs or inputs shown above the single video channel output or input.

Figure 2:
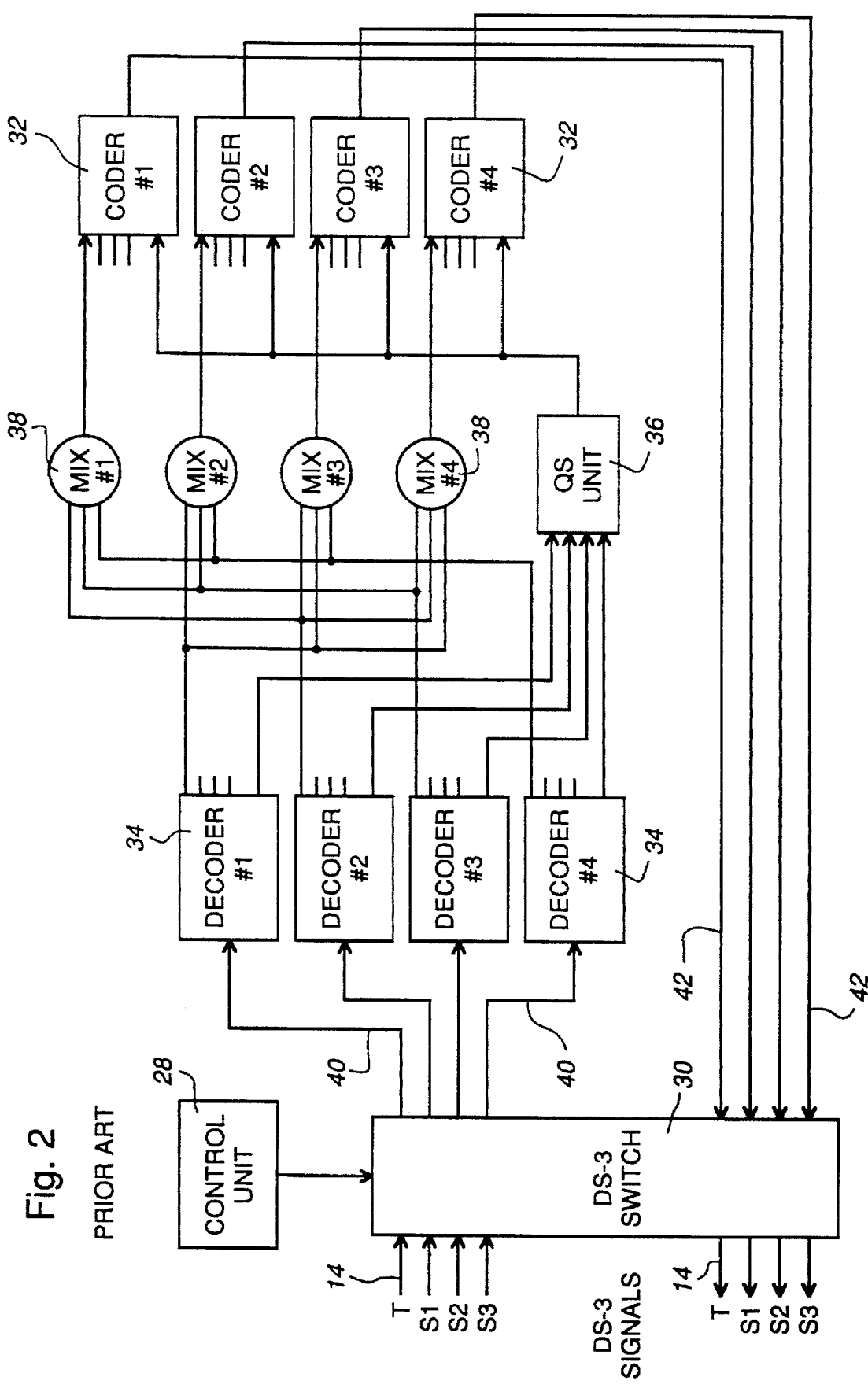
FIG. 2 schematically illustrates apparatus which is provided in the controller of the DVN in accordance with a known arrangement.

FIG. 2 illustrates apparatus which is provided in the controller 10 in the prior art. This apparatus comprises, as explained in the introduction, a DS-3 signal switch 30 controlled by a control unit 28, four video codecs the coders 32 and decoders 34 of which are shown separately in FIG. 2, a quad switch (QS) unit 36, and four audio mixers 38. The coders 32, decoders 34, and mixers 38 are numbered #1 to #4 for convenience in referring to them.

The DS-3 signals incoming on the paths 14 from the sites T, S1, S2, and S3 are supplied to the DS-3 switch 30, which supplies DS-3 signals to the decoders 34 via paths 40. The video signal outputs of the four decoders 34 are connected to the four inputs of the QS unit 36, whose single video signal output is connected to the video signal input of each of the four coders 32. DS-3 signal outputs of the coders 32 are connected via paths 42 to the DS-3 switch 30, which supplies outgoing DS-3 signals to the sites T, S1, S2, and S3 via the paths 14.

The QS unit 36 is a Panasonic Color Quad System unit WJ-450 available from the Panasonic Broadcast & Television Company division of Matsushita Electric Corporation of America. This unit produces at its output a video signal which provides a quad split or composite picture containing the four pictures, one in each quadrant, of the four video signals supplied to its inputs. Thus the pictures of the four input video signals are produced in reduced size in respectively the upper left, upper right, lower left, and lower right corners or quadrants of the composite picture of the output video signal.

The audio signals produced by the four decoders 34 are supplied to the mixers 38, whose outputs are supplied as audio signals to the coders 32; in each case only one channel of the coder 32 and decoder 34 is used. The mixers 38 are connected to operate in what is referred to as a mix-minus manner. Thus the mixer #1, whose output is supplied to the coder #1, has its inputs supplied from the decoders #2, #3, and #4 but not the decoder #1. Similarly, the mixer #2 is supplied with audio signals from the decoders #1, #3, and #4 but not the decoder #2, and supplies its output to the coder #2. The mixers #3 and #4 supply audio signals to the coders #3 and #4 respectively, and are supplied with signals from the decoders #1, #2, and #4 and from the decoders #1, #2, and #3 respectively. With the (NO ZOOM) switch connections which are described below for the DS-3 switch 30, this ensures that each site is supplied with an audio signal mix from the respective other three sites.

Figure 3:
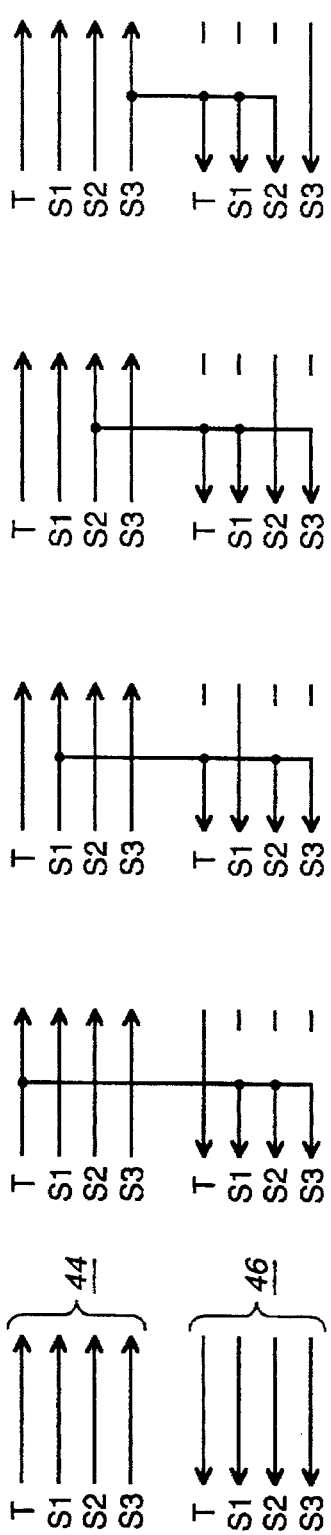
FIG. 3 illustrates switching and related details for the known apparatus of FIG. 2.

FIG. 3 is a diagram illustrating the operation of the apparatus of FIG. 2. In FIG. 3, there are five columns, one for each of the five possible operating states which are determined by the DS-3 switch connections established under the control of the control unit 28, headed NO ZOOM, ZOOM T, ZOOM S1, ZOOM S2, AND ZOOM S3. Each column contains an illustration of the switch connections provided in the respective operating state by the DS-3 switch 30, labelled DS-3 SWITCH: at the left of FIG. 3. Below this, as indicated at the left of FIG. 3 by a heading SCREEN & AUDIO and labels TO T:, TO S1:, TO S2:, and TO S3:, each column contains an indication of the video and audio signals which are supplied in the respective operating state to the respective sirs via the paths 14. In each case the video signal is represented as a square identifying the source site(s) of the picture which the video signal represents, and the audio signal mix is indicated to the right of this.

For example, the NO ZOOM operating state is provided by controlling the DS-3 switch 30 to provide straight-through connections 44 between the incoming paths 14 and the paths 40, and straight-through connections 46 between the paths 42 and the outgoing paths 14, as shown in the first column of FIG. 3. In this state the sites T, S1, S2, and S3 are all supplied with the same video signal, this being the quad split picture produced at the output of the QS unit 36 and supplied to all of the coders 32. As shown in FIG. 3, this comprises the video signals from the sites T, S1, S2, and S3 in the respective quadrants of the quad split picture. The audio signals supplied to the coders 32 are different for the different coders, consistent with the mix-minus function described above. Thus for example, as shown in the line labelled TO T:, the signal supplied from the coder #1 via the DS-3 switch 30 to the site T comprises a mix of the audio signals received from the sites S1, S2, and S3 (S1+S2+S3), this being supplied as described above from the mixer #1.

In each of the other columns of FIG. 3, a zoomed picture from one site is supplied to each of the other three sirs, and the one sir is supplied with the quad split picture output of the QS unit 36. For example, column 2 relates to the case where the picture from the sir T is zoomed (ZOOM T). The upper part of the column illustrates the modified connections in the DS-3 switch 30 which are implement this operating state. As illustrated, the paths 14 outgoing to the sites S1, S2, and S3 are in this case supplied directly from the path 14 incoming from the sir T. Consequently, as shown in the lower part of this column each of the sites S1, S2, and S3 is supplied with the video and audio signals from only the sir T. The site T is supplied with the quad split picture from the QS unit 36, and with the audio mix S1+S2+S3 from the other three sites, from the coder #1 in exactly the same manner as described above in relation to the NO ZOOM state. The other zoom states represented by the other three columns in FIG. 3 can be understood in a similar manner.

As explained in the introduction, there is an undesired switching of the audio signals supplied to the sites which accompanies changes between the zoomed and quad split pictures supplied to each site. For example, the audio signal supplied to the site S2 is desirably always the mix T+S1+S3 from the other three sites. This is the case only when a quad split picture is sent to the site: whenever a zoomed picture is supplied, the audio signal changes to the audio relating to only the zoomed site. Thus there is not a continuous audio presence at any of the sites.

Figure 4:
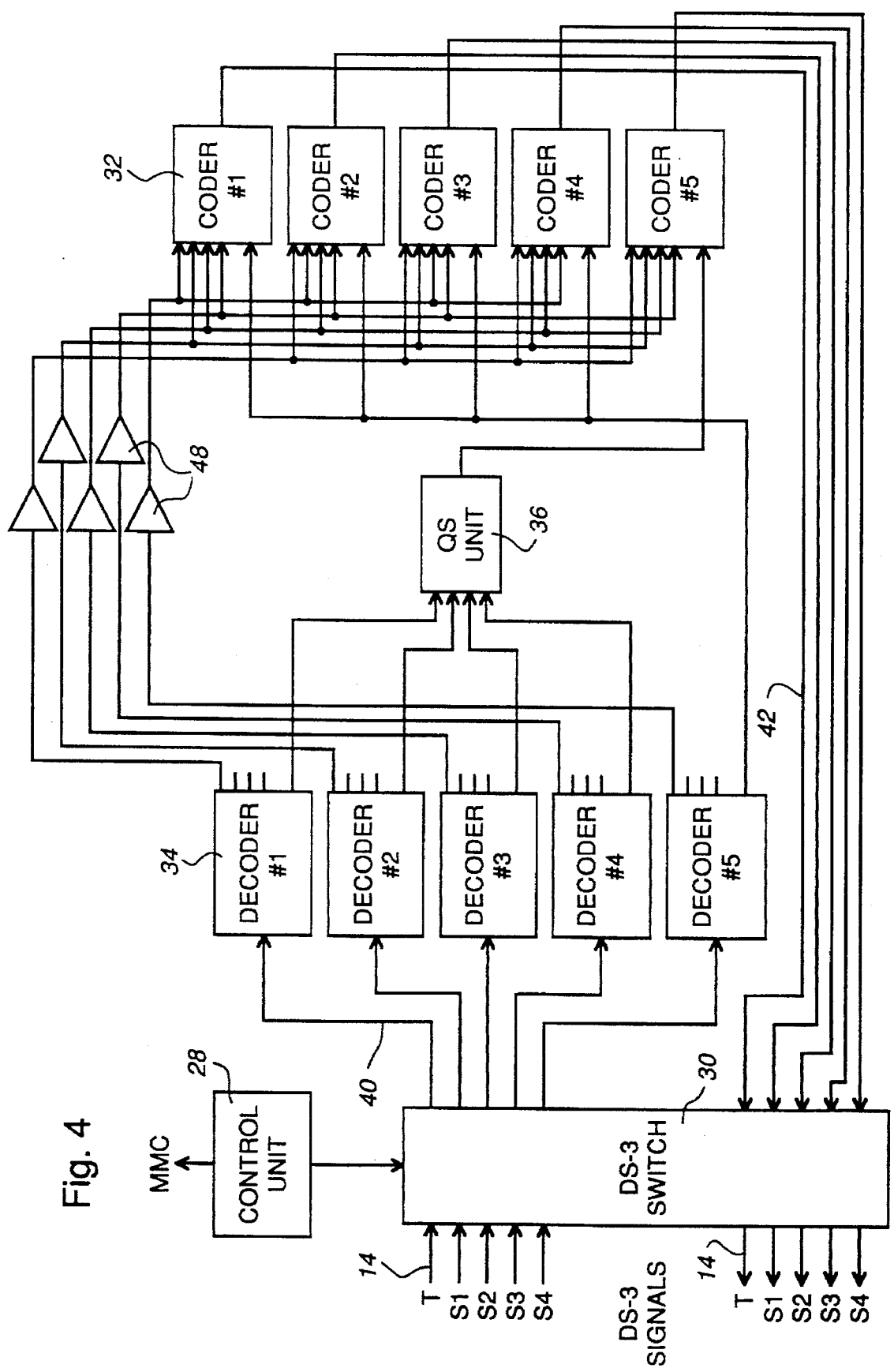
FIG. 4 schematically illustrates apparatus, including five codecs and one quad split unit, provided in the controller of the DVN in accordance with a first embodiment of the invention.

FIG. 4 illustrates an arrangement of apparatus which is provided at the controller 10 in accordance with an embodiment of this invention, which avoids this disadvantage and also enable configurations of up to five sites (4S+T) rather than only four sites as in the prior art. The same references as used above are used where applicable.

Referring to FIG. 4, the DS-3 switch 30 includes additional connections for paths 14 to and from the extra site S4, and includes an additional coder 32 and decoder 34. In addition, the control unit 28 produces mute/mix control signals MMC for the decoders at 24 at the sites T and S1 to S4. These signals MMC are supplied to the coders 32 for delivery to the decoders 24 at the respective sites only at the start of a session as further described below. There is one QS unit 36 with its inputs connected to the video outputs of the decoders #1, #2, #3, and #4 and its output connected to the video input of the coder #5. The output of the decoder #5 is connected to the video inputs of the coders #1, #2, #3, and #4. The audio mixers 38 in the apparatus of FIG. 2 are omitted, and instead in the apparatus of FIG. 4 the audio outputs of the five decoders 34 are coupled via respective ones of five audio distribution amplifiers 48 to the audio input channels of the coders 32 in a particular manner, all four audio input channels of each coder 32 being used.

More specifically, the audio input channels of the coder #1 are supplied with audio signals derived via the amplifiers 48 from the decoders #5, #2, #3, find #4 respectively. The audio input channels of the coder #2 are supplied with audio signals derived via the amplifiers 48 from the decoders #1, #5, #3, and #4 respectively. The audio input channels of the coder #3 are supplied with audio signals derived from the decoders #1, #2, #5, and #4 respectively. The audio input channels of the coder #4 are supplied with audio signals derived from the decoders #1, #2, #3, and #5 respectively. Finally, the audio input channels of the coder #5 are supplied with audio signals derived from the decoders #1, #2, #3, and #4 respectively. This pattern of connections enables the apparatus to operate conveniently in different configurations as further described below.

Figure 5:
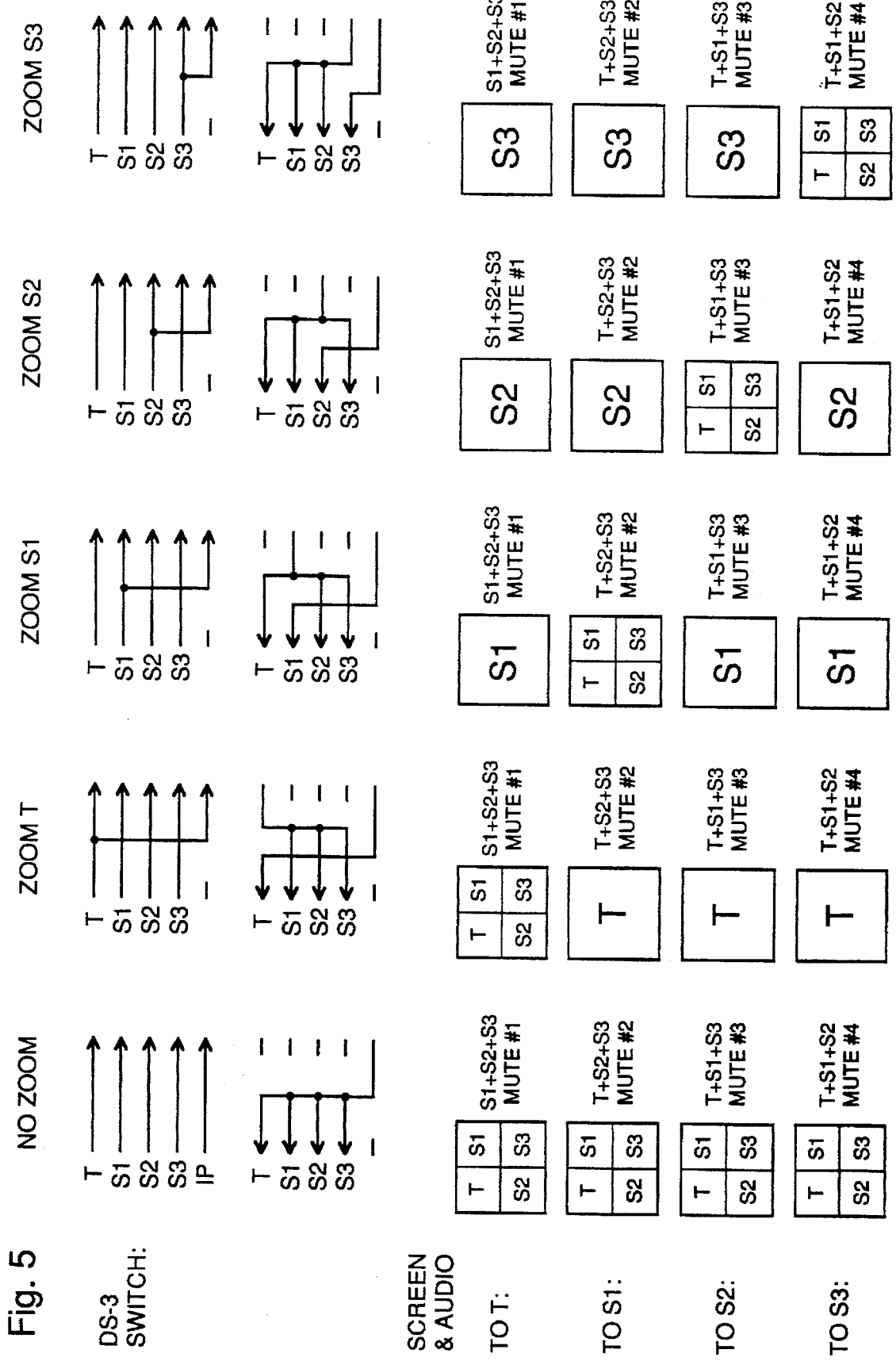
FIGS. 5, 6, and 7 illustrate switching and related details for respectively a four-site (3S+T) configuration, a three-site (2S+T) configuration, and a five-site (4S+T) configuration of the apparatus of FIG. 4.

FIG. 5 is a diagram illustrating, in the same manner as FIG. 3, the operation of the apparatus of FIG. 4 in a four-site (3S+T) configuration. The connections made wig the DS-3 switch 30 to provide the different operating states are shown in a similar manner to FIG. 3. Because this diagram relates to a four-site configuration there is no path 14 to and from a fifth site S4, so that the corresponding connections for this are open as illustrated in FIG. 5, except for an idle port IP, providing a DS-3 signal comprising a blank video signal and audio silence, being connected in the NO ZOOM state as shown in the first column of FIG. 5.

The video signals supplied to the four sites as illustrated in the lower part of FIG. 5 are identical to those as described above with reference to FIG. 3. The audio signals, however, differ from FIG. 3, and it can be seen from FIG. 5 that each site is supplied with the same audio signals in all of the operating states, i.e. regardless of whether or not the video picture is zoomed. Thus there is a continuous audio presence for all of the sites, as is desired.

As has already been explained, the DV45B video codec accommodates four audio channels. The decoder in the codec is responsive to the mute/mix command signal MMC referred to above, which is included as part of the DS-3 signal supplied to the decoder, to determine how it handles these audio channels. More specifically, for each decoder 24 this command signal can have the following values and results and is referred to by the following abbreviations:

| Value | Result | Abbreviation |
| --- | --- | --- |
| 0 | Normal operation, no mixing, no muting | NORMAL |
| 1 | Mute channel 1, mix channels 2, 3, and 4 | MUTE #1 |
| 2 | Mute channel 2, mix channels 1, 3, and 4 | MUTE #2 |
| 3 | Mute channel 3, mix channels 1, 2, and 4 | MUTE #3 |
| 4 | Mute channel 4, mix channels 1, 2, and 3 | MUTE #4 |
| F | Mix channels 1, 2, 3, and 4 | FULL MIX |

This command facility is used by the apparatus of FIG. 4 in that, at the start of a session and remaining without change for the duration of the session, the decoder 24 at each site is set up to provide a desired muting and/or mixing of the audio channels supplied to it. This setting up is illustrated in FIG. 5.

As indicated in FIG. 5, the decoder 24 in the site T is commanded (MUTE #1) to mute channel 1 and mix channels 2, 3, and 4 of the audio channels supplied to it, the decoder 24 in the site S 1 is commanded (MUTE #2) to mute channel 2 ands mix channels 1, 3, and 4 of the audio channels supplied to it, and so on.

Referring for example to the ZOOM T state in column 2 of FIG. 5, the site T is supplied via the DS-3 switch connections from the output of the coder 5, which is supplied with the quad split picture from the output of the QS unit 36. The coder 5 is also supplied, in accordance with the audio input connection pattern described above, with the audio signals from the decoders #1 to #4 on its audio channels 1 to 4 respectively, these originating at the sites T, S1, S2, and S3 respectively. The MUTE #1 command effective at the decoder 24 in the site T causes the first audio channel (which originated at this site T) in the supplied DS-3 signal to be muted and the other three audio channels (which originated at the other three sites S1, S2, and S33 to be mixed and delivered to the monitor 18 at the site T. The same comments apply for the site T in respect of the NO ZOOM state in FIG. 5, in which again the site T is supplied from the coder #5.

In the other three operating states in FIG. 5, the site T is supplied, in accordance with the DS-3 switch connections illustrated, with the output of the coder #2 (ZOOM S1), #3 (ZOOM S2), or #4 (ZOOM S3). These coders are supplied with different audio signals on the four channels, as already described. However, the arrangement is such that the correct audio signals continue to be supplied to the site T to maintain the same resulting mix of audio signals S1+S2+S3 output at the site T, and hence the desired continuous audio presence.

Thus in the ZOOM S1 state, the coder #2 producing the signal for the site T is supplied on its audio channels 1 to 4 with respectively the audio signal from the site T via the decoder #1 (this being muted on delivery to the site T by the MUTE #1 command), the audio signal from the site S1, via the DS-3 switch connections as shown at the top of column 3 in FIG. 5, and via the decoder #5, and the audio signals from the sites S2 and S3 via the decoders #3 and #4 respectively. In the ZOOM S2 state, the coder#3 producing the signal for the site T is supplied on its audio channels 1 to 4 with audio signals derived respectively from the site T via the decoder #1, this being muted at the site T as described above, and from the sites S1, S2, and S3 via the decoders #2, #5, and #4 respectively. Correspondingly, in the ZOOM S3 state, the coder #4 producing the signal for the site T is supplied on its audio channels 1 to 4 with audio signals derived respectively from the site T via the decoder #1, this being muted at the site T as described above, and from the sites S1, S2, and S3 via the decoders #2, #3, and #5 respectively.

It can be seen, therefore, that this arrangement provides a constant delivery of the audio signal mix S1+S2+S3 to the monitor 18 at the site T, thus providing a continuous audio presence at this site regardless of what video picture is displayed. A similar examination of FIGS. 4 and 5 for each of the other sites shows that each of these is equally supplied with the audio signals from all of the sites and commanded to mute the audio signal originating at this site, again to provide a continuous audio presence in each case.

Figure 6:
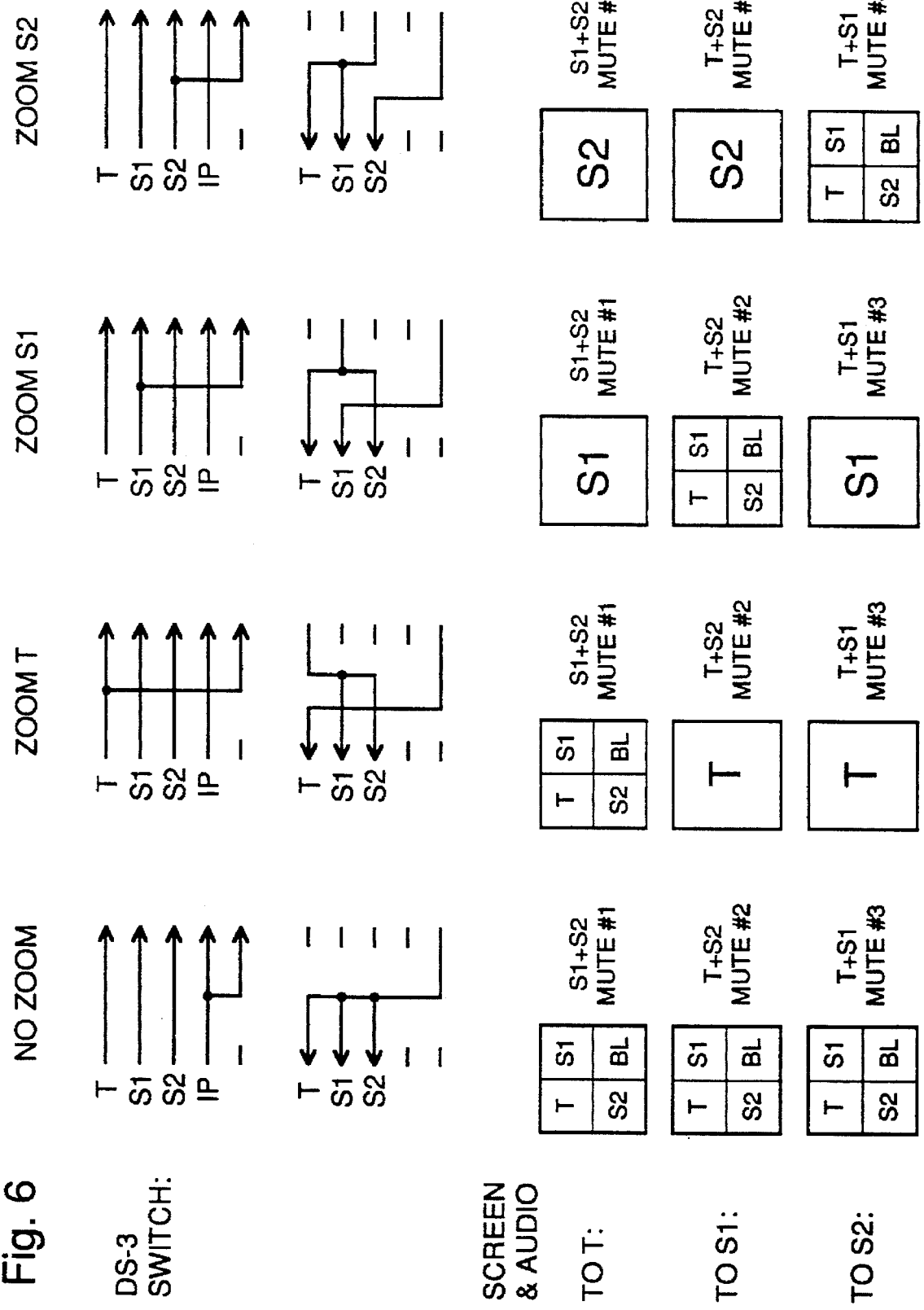

FIG. 6 illustrates, in a similar manner to FIG. 5, the operating states of the apparatus of FIG. 4 in a three-site (2S+T) configuration. FIG. 6 can be seen to be a simplification of the diagram in FIG. 5, without the last line and column relating to the site S3 and without the DS-3 switch connections for the site S3. In addition, in each quad split picture the fourth quadrant is blank (BL), this being derived from the blank video signal at the idle port IP. The operation of this configuration is substantially the same as that described above, and a continuous audio presence is provided at each site in the same manner.

Figure 7:
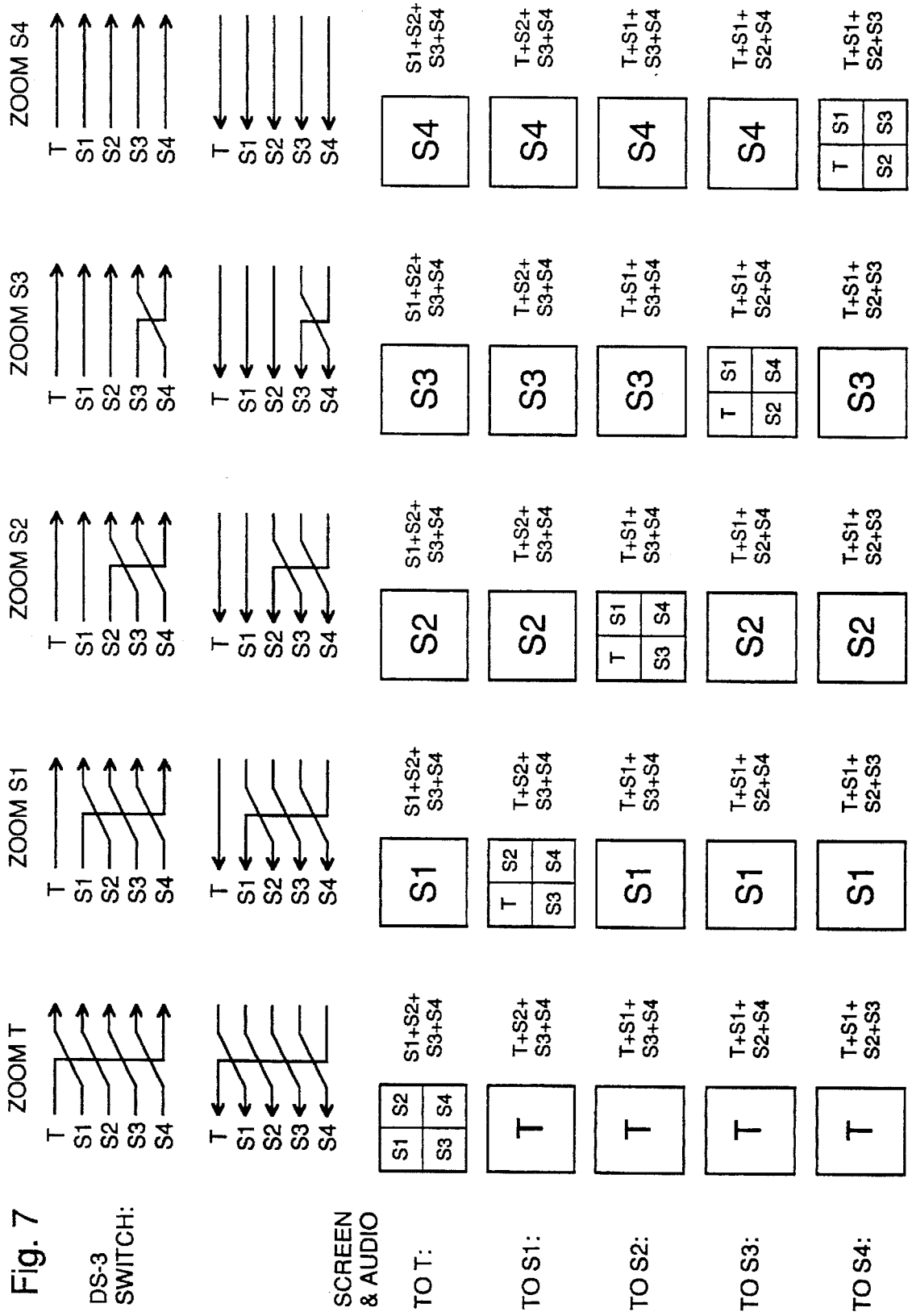

FIG. 7 illustrates, in a similar manner to FIG. 5, the operating states of the apparatus of FIG. 5 in a five-site (4S+T) configuration. In this case there is no NO ZOOM operating state, but an extra column and line are provided for the extra site S4. The decoders 24 at the sites T and S1 to S4 are all set up with the FULL MIX command (not shown in FIG. 7) so that there is no muting of any audio channels in these decoders; each decoder is always supplied on the four audio channels with audio signals originating from the four other sites, so that a continuous audio presence is maintained at all of the sites as described above. For example, in the ZOOM T state the site T is supplied from the coder #5 with the quad split picture from the QS unit and audio signals on the audio channels 1 to 4 derived from the sites S 1 to S4 respectively via the decoders #1 to #4 respectively, whereby the site T provides the output audio mix S1+S2+S3+S4. In the ZOOM S1 state this same audio mix is provided to the site T from the coder #1 with the zoomed picture from the site S1 supplied from the decoder #5, the audio signals on the audio channels 1 to 4 supplied to the coder #1 being provided via the decoders #5, #2, #3, and #4 respectively. This examination can be extended in a similar manner to the other operating states and for the other sites.

Figure 8:
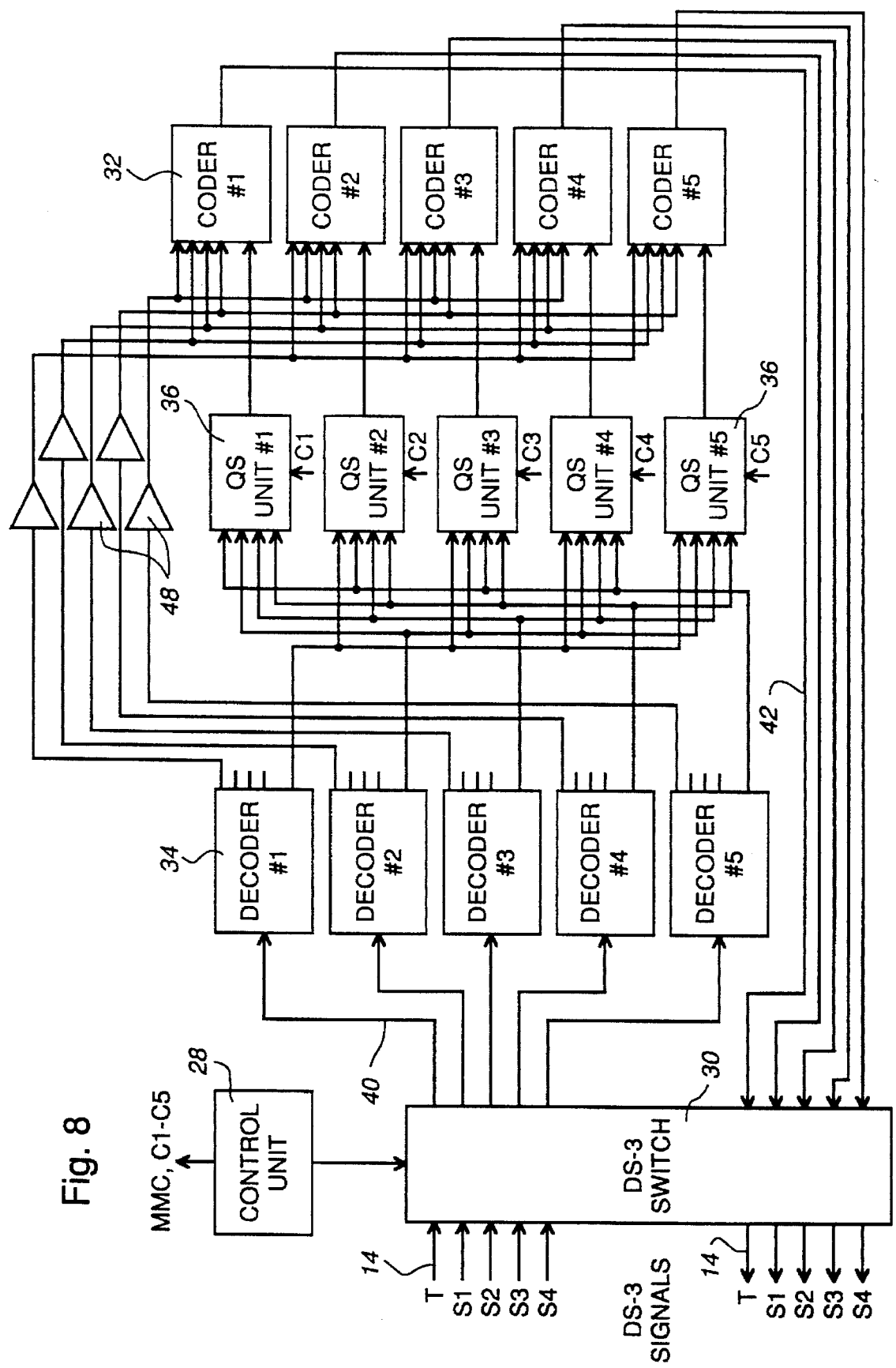
FIG. 8 schematically illustrates apparatus, including five codecs and five quad split units, provided in the controller of the DVN in accordance with a second embodiment of the invention.

FIG. 8 illustrates another arrangement of apparatus which is provided at the controller 10 in accordance with an alternative embodiment of this invention. The apparatus of FIG. 8 is the same as that of FIG. 4, except that five QS units 36 are provided, each with its output connected to the video input of a respective one of the coders 32. The video outputs of the five decoders 34 are connected to the video inputs of the five QS units 36 in the same pattern as the audio outputs of the decoders 34 are connected to the audio inputs of the coders 32, as described in detail above. In other words, the fast to fourth video inputs of the five QS units 36 are connected to the video outputs of the decoders 34 as indicated in the following table:

|            | Input #1    | Input #2    | Input #3    | Input #4    |
|------------|-------------|-------------|-------------|-------------|
| QS Unit #1: | Decoder #5 | Decoder #2 | Decoder #3 | Decoder #4 |
| QS Unit #2: | Decoder #1 | Decoder #5 | Decoder #3 | Decoder #4 |
| QS Unit #3: | Decoder #1 | Decoder #2 | Decoder #5 | Decoder #4 |
| QS Unit #4: | Decoder #1 | Decoder #2 | Decoder #3 | Decoder #5 |
| QS Unit #5: | Decoder #1 | Decoder #2 | Decoder #3 | Decoder #4 |

In addition, the QS units 36 in FIG. 5 are supplied with respective control signals C1 to C5 from the control unit 28. These control signals C determine, for each QS unit 36, whether the output signal of the QS unit is the quad split picture as has been described above, or whether it is a selected one of the four video signals supplied to the inputs of the QS unit. Thus each of the control signals C1 to C5 can have a command value of Q, 1, 2, 3, or 4 to select the quad split picture or the input signal from the first, second, third, or fourth input respectively.

For four-site (3S+T) and three-site (2S+T) configurations of the apparatus of FIG. 8, the control signals C1 to C5 have the command values 1, 2, 3, 4, and Q respectively. The apparatus of FIG. 8 then operates in exactly the same manner as described above, for the apparatus of FIG. 4, with reference to FIGS. 5 and 6 respectively.

Figure 9:
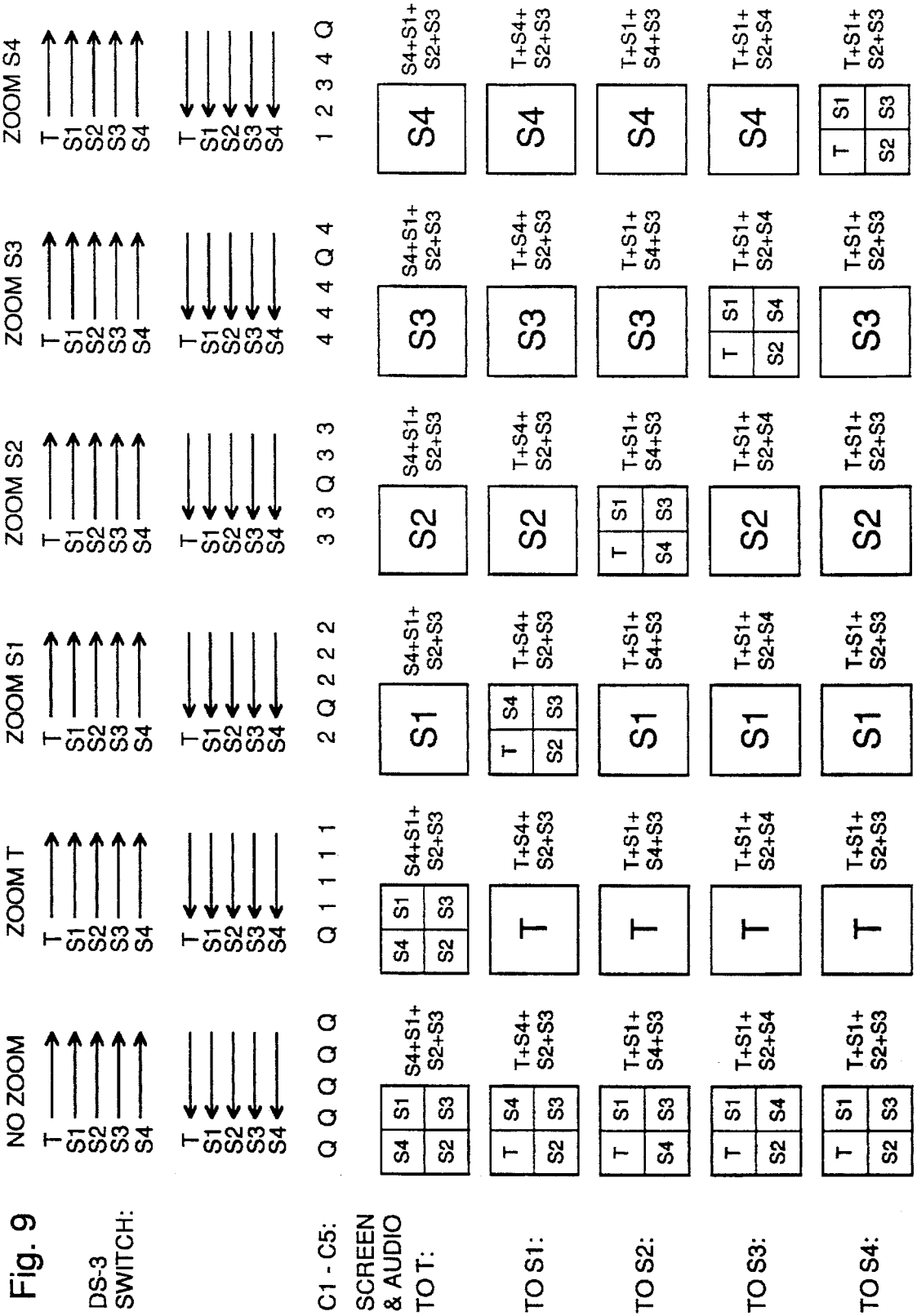
FIG. 9 illustrates switching and related details for a five-site (4S+T) configuration of the apparatus of FIG. 8.

FIG. 9 illustrates, in a similar manner to FIG. 7, the operating states of the apparatus of FIG. 8 in a five-site (4S+T) configuration. In this case there is a NO ZOOM operating state, as well as the five different zoomed operating states. It can be seen from FIG. 9 that in all of the operating states the DS-3 switch provides straight-through connections between the paths 40, 42 and the paths 14. Control of the various states is provided by the control signals C1 to C5, whose command values are shown in FIG. 9 for each operating state. This has the advantage that the DS-3 switch performs no switching functions during a session, it merely serving to set up desired connections among the sites at the start of a session. Consequently the DS-3 switch can have a relatively low switching speed without this causing any problems. The decoders 24 at the sites T and S1 to S4 are all set up with the FULL MIX command (not shown in FIG. 9) so that there is no muting of any audio channels in these decoders; each decoder is always supplied on the four audio channels with audio signals originating from the four other sites, so that a continuous audio presence is maintained at all of the sites, in the same manner as described above with reference to FIGS. 4 and 7.

In the NO ZOOM state shown in the fist column of FIG. 9, all of the QS units 36 are controlled, by the control signals C1 to C5 all having the command value Q, to provide respective quad split pictures at their outputs, these video signals being supplied via the respective coders 32 to the respective sites. In each of the other operating states, a respective one of the QS units 32 is supplied with the control signal command value Q to supply the respective quad split picture to the corresponding site, and a zoomed picture from that site is selected for supply to all of the other sites by appropriate command values 1 to 4 of the respective control signals C1 to C5, as indicated in FIG. 9.

Figure 10:
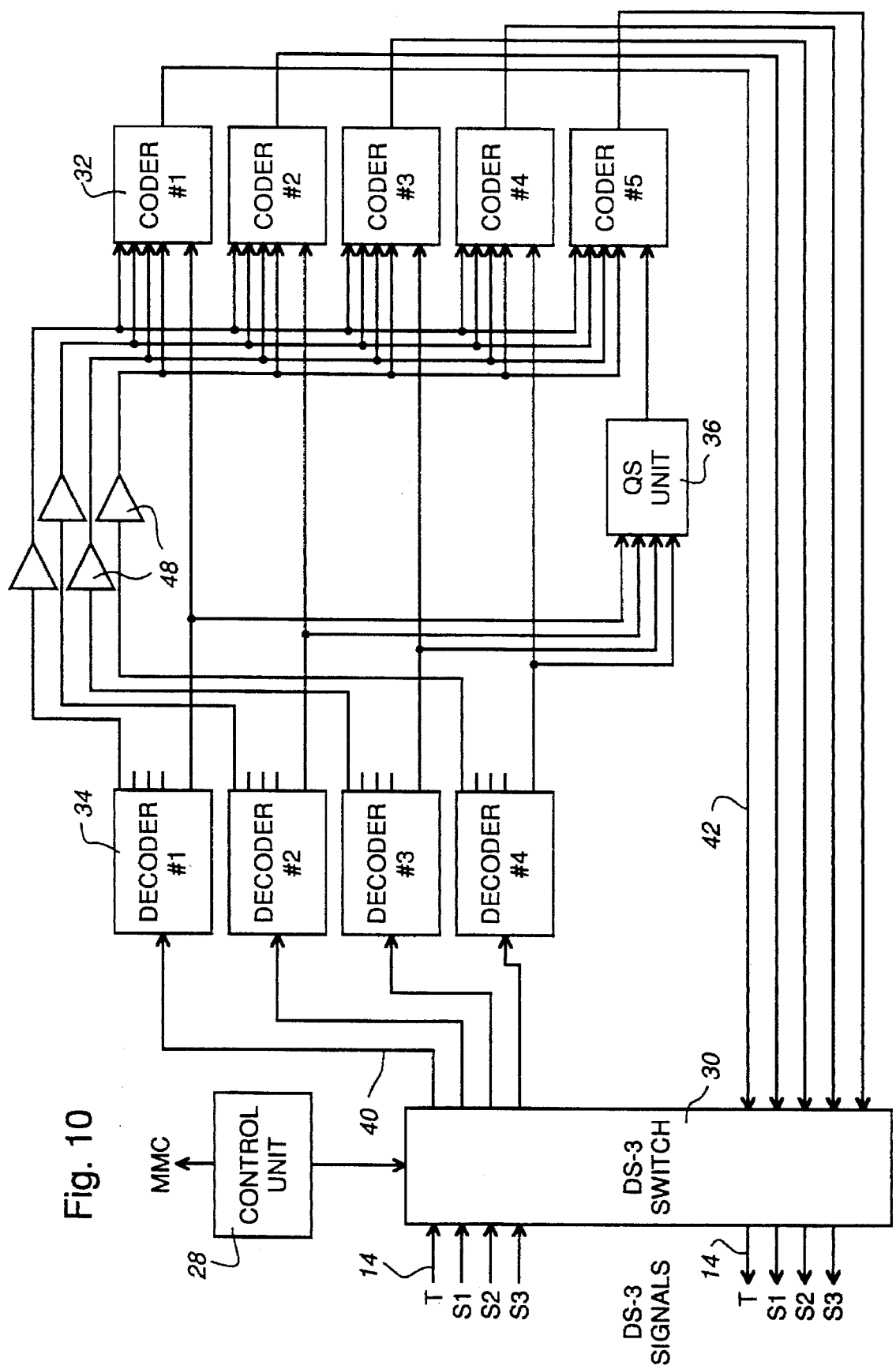
FIG. 10 schematically illustrates apparatus, including five coders, four decoders, and one quad split unit, provided in the controller of the DVN in accordance with another embodiment of the invention.

FIG. 10 illustrates another arrangement of apparatus which can be provided at the controller 10 in accordance with a further alternative embodiment of this invention. The apparatus of FIG. 10 is similar to that of FIG. 4, except that it provides for a maximum of four sites (3S+T) and includes only four decoders 34 and four amplifiers 48. There are five coders 32, each having its four audio input channels connected to receive the audio outputs of the decoders #1 to #4 via the amplifiers 48. The video inputs of the coders #1 to #4, and the video inputs of the QS unit 36, are connected to the video outputs of the decoders #1 to #4 respectively, and the video input of the coder #5 is connected to the video output of the QS unit 36.

The apparatus of FIG. 10 operates in a four-site (3S+T) configuration in exactly the same manner as described above for the apparatus of FIG. 4 with reference to FIG. 5, and operates in a three-site (2S+T) configuration in exactly the same manner as described above for the apparatus of FIG. 4 with reference to FIG. 6. In each case, muting of audio channels in the decoders 24 at the sites T and S1 to S3 is carried out in the same manner as described above with reference to FIG. 5 using the mute/mix command signals MMC.

Although the apparatus of FIG. 10 requires one less audio amplifier 48 and one less decoder 34 than the apparatus of FIG. 4, the need for one less decoder provides no advantage given that five coders 32 are required and the coders and decoders are normally provided as a combined codec, and the advantage of one less audio amplifier is more than offset by the limitation to four sites rather than five. Accordingly, the apparatus of FIG. 4 is preferred to that of FIG. 10.

Although particular embodiments of the invention and their operation have been described in detail above, it should be appreciated that numerous modifications, variations, and adaptations may be made without departing from the scope of the invention as defined in the claims.

What is claimed is:

1. A method of communicating encoded signals between a controller and a plurality of network sites of a digital video network via respective communications paths, comprising the steps of:

in the controller, decoding an encoded signal received from each network site to produce a video signal and an audio signal, producing at least one composite picture video signal from a plurality of the video signals, and coding selected ones of the video signals and the composite picture video signal each with a plurality of the audio signals and a control signal to produce an encoded signal for supply to each network site; and in each network site, producing a local video signal and a local audio signal in the network site, encoding the local video signal and the local audio signal to produce an encoded signal for supply to the controller, decoding an encoded signal received from the controller to produce a video signal and a plurality of audio signals, mixing the plurality of audio signals in a predetermined manner in accordance with the control signal in the received encoded signal, thereby to produce a mixed audio signal comprising audio signals from the respective other network sites without the respective local audio signal, and reproducing the video signal and the mixed audio signal.

2. A method as claimed in claim 1 wherein there are up to four network sites, the audio signals from all of the network sites are supplied to each coder in the controller, and the control signal in the encoded signal supplied to each network site controls the decoder in the network site to mix all of the audio signals except that derived from the respective network site to produce the mixed audio signal.

3. A method as claimed in claim 1 wherein there are five network sites, the audio signals from a respective group of four of the network sites are supplied to each coder in the controller, each network site is supplied from a respective coder in the controller with an encoded signal including the audio signals derived from the respective four other network sites, and the control signal in the encoded signal supplied to each network site controls the decoder in the network site to mix all of the audio signals to produce the mixed audio signal.

4. A digital video network comprising a controller and a plurality of network sites among which encoded signals are communicated via communications paths coupling each network site to the controller, the network sites and the controller including coders and decoders for converting between the encoded signals on the communications paths and video and audio signals in the network sites and in the controller, the controller further including at least one unit for producing a composite picture video signal from a plurality of video signals supplied thereto, wherein the coders provide for encoding a plurality of audio signal channels and audio mixing control signals in the encoded signals, each coder in the controller is supplied with audio signals from a plurality of decoders in the controller and with a control signal for determining a mix of these audio signals, and the decoders in the network sites provide for decoding the plurality of audio signal channels from the encoded signals, and wherein each decoder in a network site is responsive to the control signal in the encoded signal which it receives to mix the plurality of decoded audio signal channels in a predetermined manner to provide a continuous audio presence at each network site independently of whether or not the video signal in the encoded signal supplied to each network site comprises said composite video signal.

5. A digital video network as claimed in claim 4 wherein the controller comprises at least four decoders and five coders each having inputs for four audio signal channels.

6. A digital video network as claimed in claim 5 wherein the controller comprises five decoders, each coder in the controller having its inputs for four audio signal channels coupled to a respective group of four of the five decoders.

7. A digital video network as claimed in claim 6 wherein the controller comprises five units each for selectively producing a respective composite picture video signal for a respective coder from the four video signals from the respective group of four of the five decoders.

8. A digital video network controller for receiving encoded signals from and supplying encoded signals to network sites via respective communications paths, each network site including a video coder and decoder, the controller comprising:

at least four video decoders each having an input for an encoded signal, an output for a video signal, and an output for an audio signal;

five video coders each having an input for a video signal, four inputs for audio signals, and an output for an encoded signal;

a switching unit for coupling the encoded signal inputs of the decoders and the encoded signal outputs of the coders to the communications paths for respectively receiving encoded signals therefrom and supplying encoded signals thereto;

video signal connections, including at least one quad split unit, coupling the video signal outputs of the decoders to the video signal inputs of the coders, the quad split unit providing a video signal representing a composite of four video signals supplied thereto;

audio signal connections coupling the audio signal output of each decoder to audio signal inputs of at least four of the video coders; and a control unit for controlling the switching unit and for controlling the decoder at each network site to provide a mix of at least three of the four audio signals in the encoded signal supplied to it, thereby to provide a continuous audio presence at each network site.

9. A digital video network controller as claimed in claim 8 wherein each audio signal connection coupling the audio signal output of a decoder to audio signal inputs of the coders comprises an amplifier.

10. A digital video network comprising a digital video network controller as claimed in claim 8 and at least two network sites coupled to the controller via the communications paths, each network site including a video coder for supplying encoded signals via a respective communication path to the controller, a video camera for supplying video and audio signals to the video coder, a video decoder for receiving encoded signals via a respective communication path from the controller, and a monitor for reproducing at the network site video and audio signals decoded by the decoder, wherein the encoded signals received by the decoder at each network site include control signals from the control unit of the controller for determining a mix of audio signals supplied from the decoder to the monitor.

11. A digital video network controller as claimed in claim 8 wherein there are five decoders, the quad split unit has four video signal inputs coupled to the video signal outputs of four of the decoders and a video signal output coupled to the video signal input of one of the coders, and the video signal output of the fifth decoder is coupled to the video signal input of each of the other four coders.

12. A digital video network controller as claimed in claim 11 wherein each audio signal connection coupling the audio signal output of a decoder to audio signal inputs of the coders comprises an amplifier.

13. A digital video network comprising a digital video network controller as claimed in claim 11 and at least two network sites coupled to the controller via the communications paths, each network site including a video coder for supplying encoded signals via a respective communication path to the controller, a video camera for supplying video and audio signals to the video coder, a video decoder for receiving encoded signals via a respective communication path from the controller, and a monitor for reproducing at the network site video and audio signals decoded by the decoder, wherein the encoded signals received by the decoder at each network site include control signals from the control unit of the controller for determining a mix of audio signals supplied from the decoder to the monitor.

14. A digital video network controller as claimed in claim 8 wherein there are five decoders and five quad split units, each quad split unit has a video signal output coupled to the video signal input of a respective corresponding one of the coders, wherein each quad split unit has four video signal inputs coupled to the video signal outputs, and the four audio signal inputs of the corresponding coder are coupled to the audio signal outputs, of a respective set of four of the five decoders, and wherein the control unit further provides control of each quad split unit to supply selectively to its video signal output either the video signal representing a composite of the four video signals supplied to the quad split unit or a selected one of the four video signals supplied to the quad split unit.

15. A digital video network controller as claimed in claim 14 wherein each audio signal connection coupling the audio signal output of a decoder to audio signal inputs of the coders comprises an amplifier.

16. A digital video network comprising a digital video network controller as claimed in claim 14 and at least two network sites coupled to the controller via the communications paths, each network site including a video coder for supplying encoded signals via a respective communication path to the controller, a video camera for supplying video and audio signals to the video coder, a video decoder for receiving encoded signals via a respective communication path from the controller, and a monitor for reproducing at the network site video and audio signals decoded by the decoder, wherein the encoded signals received by the decoder at each network site include control signals from the control unit of the controller for determining a mix of audio signals supplied from the decoder to the monitor.

17. A digital video network controller as claimed in claim 8 wherein there are four decoders, the quad split unit has four video signal inputs coupled to the video signal outputs of the four decoders and a video signal output coupled to the video signal input of one of the coders, and the video signal outputs of the four decoders are also coupled each to the video signal input of a respective one of the other four coders.

18. A digital video network controller as claimed in claim 17 wherein each audio signal connection coupling the audio signal output of a decoder to audio signal inputs of the coders comprises an amplifier.

19. A digital video network comprising a digital video network controller as claimed in claim 17 and at least two network sites coupled to the controller via the communications paths, each network site including a video coder for supplying encoded signals via a respective communication path to the controller, a video camera for supplying video and audio signals to the video coder, a video decoder for receiving encoded signals via a respective communication path from the controller, and a monitor for reproducing at the network site video and audio signals decoded by the decoder, wherein the encoded signals received by the decoder at each network site include control signals from the control unit of the controller for determining a mix of audio signals supplied from the decoder to the monitor.

* * * * *